3,194,752
PRODUCTION OF RESINS FROM
HYDROCARBONACEOUS PITCH
Nathaniel M. Winslow, 2115 Riverside Drive,
Cleveland 7, Ohio
No Drawing. Filed Apr. 2, 1962, Ser. No. 184,523
4 Claims. (Cl. 208—44)

This application is a continuation-in-part of my copending application Serial No. 808,932, filed April 27, 1959, now abandoned.

This invention relates to resins and methods of their production, and more particularly to the production of hydrocarbonaceous resins.

An object of the invention is to provide a new class of hydrocarbonaceous resinous materials which may be produced economically and converted readily into thermoset compositions which are relatively inert chemically and which are highly resistant to chemical changes at elevated temperatures. A further object is to provide a process in which catalysts are employed for reducing the cure time of the resin while also plasticizing the resin. A further object is to produce a thermoplastic carbonaceous resin which is a solid and which has no draw point at 275° C. and above.

A still further object is to produce a composition in which said resin is combined with fillers, including cellulose as well as mineral fibers and in which the resin is combined with other composition materials and bodies. Yet another object is to produce a resinous combination useful in shell molding, cold molding, and with chemically resistant fibers in the production of chemical ware, etc. A still further object is to provide a highly resistant resinous cement composition. A yet further object is to provide a process for forming a resin from pitch or from materials derived from pitch having at least three rings in benzhomologous relationship (including phenanthrene, chrysene, and anthracene). Other specific objects and advantages will appear as the specification proceeds.

In accordance with this invention, hydrocarbonaceous resinous materials are provided from which thermosetting and thermoset resinous compositions may be produced and from which thermoplastic resins which are not thermosetting are also produced, all of which resins being relatively inert chemically, and resistant to deterioration at elevated temperatures.

Thermoplastic resin formed in accordance with this invention may be one having no draw point, yet fusible between 275° and 400° C. Furthermore, such a thermoplastic resin may be one having a low draw point as, for example, 150° C., and such a resin, because of its fluidity, is useful in connection with celluosic fillers because such material readily penetrates the pores and recesses of the cellulose. A thermoplastic resin may be produced by the reaction of pitch, or ingredients thereof, with an oxidizing agent which is insufficient in amount to bring about complete thermosetting. The resulting thermoplastic resin, which is not thermosetting, is nevertheless effective upon heating to form with the filler material a hard molded product having high chemical resistance. Molding compositions comprising thermoplastic resins and fillers can be shaped and formed by techniques which are essentially similar to those used for conventional thermoplastics, for example, extrusion, injection molding, etc.

A thermosetting resin preferably having a draw point within the range of 175-275° C. is very useful because it may be combined as a granular resin with various types of fillers and particularly with heat-resistant mineral fillers in the production of a thermally resistant, thermoset composition. Further, in the forming of a chemically resistant material, the powdered resin may be mixed with a mineral filler and subsequently molded and thermoset under elevated temperature conditions. The hydrocarbonaceous resins are useful, as will be later described, in the forming of shell molds because of the high temperature and chemical resistance. They are also useful in cold molding procedure whereby the blending and molding operation can be carried out at relatively low temperature and the molded product then thermoset or hardened in a heating operation. The resin is particularly useful as a cement in the repairing of refractory linings for furnaces, chemical tanks and vessels, stopping the tapping holes of steel furnaces.

In cement applications, the resin may be prepared from pitch and oxidizing agent and subseqeuntly combined with a suitable filler to form a cement composition. Alternately, the filler may be mixed with the resin-forming materials, pitch, and oxidizing agent; and the composition, without substantial reaction, can be used as a cement under conditions of moderate heating, sufficient to cure the resin in the thermoset condition, but insufficient to cause evaporation of oxidizing agent before the initial stages of reaction have occurred. Under such conditions, the use of a substantially unreacted mixture of pitch and oxidizing agent can provide a degree of tack which permits hand tamping or compression molding at room temperatures. Plasticizers may be incorporated, either with the resin or with the substantially unreacted resin-forming materials, to provide additional tack.

The thermosetting hydrocarbonaceous materials of this invention are partially cured, solid at 25° C., have a draw point within the range of 175° and 275° C. and have 25% to 60% benzene-soluble components. Preferably, the thermosetting materials have a draw point within the range of 200°-260° C. and have benzene-soluble components of 35% to 45%. Desirably, for many purposes, the thermosetting hydrocarbonaceous material is incorporated in a molding composition containing a filler, such as asbestos. Preferably, such molding composition manifests at 300° C. plasticity when subjected to 500 lbs. per square inch pressure, manifests no significant plasticity when subjected to 5 lbs. per square inch pressure, and evolves no significant amounts of gaseous products when completely cured.

A convenient method of ascertaining plasticity of the precured thermosetting molding composition at 300° C. is by subjecting one disc of the material to be tested at 300° C. to a pressure of 5 pounds per square inch and another disc of the same material at 300° C. to a pressure of 500 pounds per square inch. Conveniently, the discs have a cross-sectional area of about four square inches and a thickness of about three-eighths inch. The discs are formed by compacting at room temperature the material to be tested in a circular mold at about 2000 pounds pressure per square inch. One of the discs is placed between the platens of a molding press which has been brought to a temperature of 300° C. A pressure of 5 pounds per square inch is then applied as quickly as possible thereafter, and the flow of the material in the disc is determined by the change in the thickness during a ten-minute period under the 5 pounds per square inch pressure. The precured thermosetting composition should not manifest any significant plasticity at 5 pounds per square inch pressure.

A similar disc of the material is then inserted between the platens, maintained at 300° C. and a pressure of 500 pounds per square inch is rapidly applied to the disc. Plasticity again is determined by the change in thickness of the disc. The precured thermosetting composition should manifest significant plasticity at 500 pounds per square inch pressure.

The partially cured, essentially hydrocarbonaceous thermosetting resinous material of this invention may be prepared by mixing a hydrocarbonaceous pitch, more particularly later described, with an oxidizing agent, such as a dinitrobenzene, and heating the mixture within the range of 165° C. to 400° C. until the reaction product has a draw point within the range of 175° C. to 275° C. and contains 25 to 60% of benzene-soluble components. For example, the mixture of the hydrocarbonaceous pitch and the oxidizing agent may be heated at a temperature within the range of 185° C. to 250° C. until the reaction mixture has a draw point within the range of 200° C. to 260° C. and contains 35 to 45% of benzene-soluble components. A convenient procedure is to heat the mixture of the hydrocarbonaceous pitch and the oxidizing agent to a temperature within the range of 165° C. and 275° C. without excessive foaming, and continuing the heating until the rate of cure of the mixture decreases upon further heating. Desirably, the heating is continued until the rate of increase of the draw point of the reaction product is less than 3° C. per hour while the temperature is maintained substantially constant. One most desirable procedure is to start heating the mixture of pitch and oxidizing agent, such as a polynitro-benzene, at 165° C. to 180° C. and then to further heat to a temperature within the range of 200° C. to 250° C. at a rate sufficiently slow to avoid excessive foaming of the reaction mixture, and finally continuing the heating until the draw point of the reaction product is within the range of 175° C. to 275° C. Again, the partially cured thermosetting resin may be produced by heating the hydrocarbonaceous pitch with an oxidizing agent starting at about 185° C. and going to temperatures within the range of 200° C. to 225° C. The temperature is raised at a rate sufficiently slow to avoid foaming and the heating is continued until the draw point of the reaction product is within the range of 175° C. to 275° C., and preferably within the range of 200° C. to 260° C.

It is essential that the hydrocarbonaceous pitches used as starting materials for the production of the thermosetting compositions of this invention have the following characteristics: Solid, semi-solid or viscous liquid materials, essentially hydrocarbon in nature and susceptible to softening, melting or lowering of viscosity on application of heat, which (a) have at 25° C. a specific gravity of 1.02 or greater referred to water at 4° C., and (b) when heated for 72 hours at 450° C., in a closed vessel where distillation is not possible, will yield at least 60%, based on the weight of the pitch so heated, of solid material which, on further heating to 950° C. at atmospheric pressure but in the absence of oxygen, will yield a carbon residue amounting to at least 80% of the solid product from the pitch.

The cure time of the resin is substantially reduced through the use of catalysts comprising esters of polybasic acids. I prefer to employ as such catalysts, phenolic esters of polybasic acids and aromatic esters of polybasic oxygen-containing acids. The acid may be tri-functional, such as, for example, the phosphates and phosphites, or di-functional, as, for example, sulfates. Specific examples are tricresyl phosphate, phenyl phosphite, phenyl sulfate, etc. When catalysts of the above character are employed with the nitro oxidizing agent, the cure time is reduced one-half or more.

Of the pitches available on the market, the class useful in the invention comprises chiefly the coal tar pitches. However, some pitches within the class have been produced from other sources, notably mineral oil pitches, or petroleum pitches. Some coal tars, particularly the refined coal tars, also are included within the class useful for the practice of this invention. Also included are hydrocarbon compounds which fall within the class of hydrocarbonaceous pitches defined above. Materials which will not meet the above requirements for hydrocarbonaceous pitches are saponifiable pitches, such as stearine, wool grease, and bone pitches and most of the asphalts, both manufactured and natural.

Perhaps the most useful compositions of this invention are molding compositions comprising a filler and a partially cured, essentially hydrocarbonaceous thermosetting resinous material. Such molding compositions are useful in the production of molded articles by subjecting the molding compositions to super-atmospheric pressure, such as pressures of 1,000 to 4,000 pounds per square inch and to temperatures between 250° C. and 350° C., until the partially cured resinous materials are converted into substantially infusible thermoset resins, as described in the copending application Serial No. 564,110, filed February 8, 1956, now abandoned.

The molding compositions of this invention are produced from the partially cured, essentially hydrocarbonaceous resinous material, which is thermosetting, solid at 25° C., has a draw point within the range of 175° C. to 275° C., and has 25% to 60% benzene-soluble components. Such partially cured resinous material is mixed with a filler and other components, if desired.

The mixture comprising the partially cured resin and filler may be used as a molding composition. Preferably, for many purposes, a precure, short of complete cure, is effected to disperse the partially cured resinous material over the surface of the filler and to eliminate a large portion of the gas which would be evolved in the complete cure of the resin, were such precure not effected.

For effecting such precure, the mixture is heated to a temperature in the range of 165° C. to 400° C. for a period sufficient to effect a further cure of the resinous material, but insufficient to convert it into an infusible thermoset resin. Desirably, the mixture is heated to a temperature above the draw point of the partially cured resinous material to cause it to flow, but without converting it into an infusible thermoset resin. Preferably, the heating of the mixture is continued for a period sufficient to increase substantially the cure of the resinous material to an extent that it may be later completely cured without significant evolution of gas.

Thermoset compositions are produced from the thermosetting hydrocarbonaceous materials of this invention by heating at a temperature of 250° C. to 350° C. and continuing the heating until the thermosetting material is converted into a substantially infusible thermoset composition. This conversion is effected regardless of whether or not the thermosetting material is admixed with other components, such as fillers, or whether or not such material is contained in a precured molding composition. If the thermosetting resinous material is contained in a precured molding composition, it is desirable to effect the complete cure at a lower temperature than that of the precure heating.

A more comprehensive understanding of this invention may be obtained by reference to the following examples.

EXAMPLE 1

This example illustrates the production of the thermosetting hydrocarbonaceous resinous materials of this invention by the utilization of various oxidizing agents.

The starting pitch used in this example was a "medium"

pitch obtained from a tar distiller. It melted at about 100° C. and was soluble in benzene to the extent of 75.1%.

This coal tar pitch as well as all of the other pitches employed in all of the examples disclosed herein complied with all of the requirements for the hydrocarbonaceous pitch heretofore described. More particularly, each of the pitches employed in the examples had a specific gravity of 1.02 or greater and when heated for 72 hours at 450° C. in a closed vessel where distillation is not possible would yield at least 60% of solid material based on the weight of the pitch so heated and that solid material, on further heating to 950° C. at atmospheric pressure but in the absence of oxygen, would yield a carbon residue amounting to at least 80% of the solid products from the pitch.

Samples of this pitch were mixed with oxidizing agents in the proportions shown in the tabulation below. The mixtures were heated, while protected from air, under conditions of time and temperature also shown in the tabulation. The products were weighed to determine yield, and then characterized by solubility in benzene. Other oxidizing agents such as picric acid could be employed rather than those described in this example. For comparison, the same pitch without any oxidizing agent was treated for a longer period, but otherwise in the same manner, as some of the mixtures of pitch and oxidizing agent.

| Reagent used | Amount of reagent (% of pitch) | Conditions of heating | | Characteristics of product | |
|---|---|---|---|---|---|
| | | Time (hours) | Temperature (° C.) | Solubility in benzene (percent) | Yield (percent of pitch) |
| m-Dinitrobenzene | 11.1 | 96 | 225 | 35.5 | 102.3 |
| Sulfuric acid | 11.3 | 72 | 225 | 39.5 | 99.4 |
| Benzene di-sulfonic acid | 15.8 | 48 | 225 | 34.0 | 105.6 |
| Benzene disulfonic acid | 15.8 | 48 | 250 | 32.0 | 103.2 |
| Nitric acid | 6.2 | 120 | 205 | 35.0 | |
| Ammonium nitrate | 9.3 | 120 | 205 | 46.5 | 99.8 |
| None | None | 168 | 205 | 74.0 | 99.9 |

The benzene solubility of the samples was measured by refluxing, for one hour with 100 cc. of benzene, one gram of the resin, which had been ground to pass a 65 mesh screen. After refluxing, the undissolved residue was brought upon a weighed filter, washed with additional benzene, dried at 100° to 110° C. and weighed.

The preparations of Example 1 show that a wide variety of oxidizing agents, including oxidizing acids, oxidizing salts, and organic compounds such as nitro compounds and sulfonates are effective in varying degree for producing the polymerization of pitch, as indicated by decreased solubility and volatility. The salts are less effective than the corresponding acids, perhaps due to the fact that they are not soluble in the pitch. The most useful reagents for carrying out the invention are oxidizing acids such as sulfuric and nitric and organic compounds such as sulfonates and nitro compounds.

In any resin system, wherein a thermosetting or thermoset resin can be formed from two or more starting materials, the starting materials are used in proper amounts to achieve the desired results. For example, in the well-known phenol-aldehyde system sufficient aldehyde, in proportion to the phenol, is used, regardless of the identity of the aldehyde as formaldehyde, acetaldehyde, or other. If too little aldehyde is used, thermosetting resins are not obtained as shown for example, by the "two-step" phenolic-aldehyde resins from which thermosetting or thermoset products cannot be obtained unless additional aldehyde is added to the intermediate resin. If excess aldehyde is used, the properties of the final product may be altered, or perhaps the excess may be wasted because the combining capacity of the phenol is not sufficient to react with all the aldehyde present.

In the phenol-aldehyde system it is relatively easy to choose and define the proper amount of aldehyde because the reaction whereby thermosetting and thermoset resins are formed is a reaction of two recognized functional groups, the aldehyde and the hydroxyl of the phenol. On the other hand, with a mixture as complex as pitch, and with oxidizing agents which can be reduced in several different ways or to several different levels, it is not possible to identify chemically equivalent amounts of reactants with the precision possible in the phenol-aldehyde system, nor is it possible to define oxidizing equivalence as in ordinary analytical chemistry. Nevertheless, it has been found by experiment that there is a minimum amount of oxidizing agent required with pitches herein defined to produce the thermoset resins described in the application Serial No. 564,110 and thermosetting resins of this invention. Somewhat less than that minimum may be used if completely thermoset characteristics are not ultimately required, as for resins to be used at relatively low temperatures. However, if a thermosetting resin is to be employed for the ultimate production of a thermoset resin, at least the minimum is used. Generally it is preferred to use somewhat more than the minimum to insure completely thermosetting properties and to provide for small processing variables. Very considerable excess may be used to provide more rapid reaction or to obtain the modification of properties as herein described in connection with Example 7. For example, if m-dinitrobenzene is used as oxidizing agent in amount equal to 14% of the pitch by weight, a product that is barely thermoset is obtained when the reaction is ultimately carried to completion. If only 11% is used, the final resin produced will not be ultimately completely thermoset, even when the resin-forming reaction has been carried to completion. However, the final product will soften only at very high temperatures and is useful where completely thermoset properties are not necessary. Even less than 11% of m-dinitrobenzene may give useful resinous products. For example, if 7.5% is used, the normal polymerizing reaction proceeds until the oxidizing agent is exhausted. At this point, the resin is only partially thermoset, being a thermoplastic like the "two-step" phenol-aldehyde resins. Unlike the phenolics, however, this resin is useful because of its relatively high softening point and high chemical resistance. It has been found that the thermoplastic produced with m-dinitrobenzene in proportion of 7.5% of the pitch weight has softening characteristics which permit molding by conventional procedures as with steam heated platens, or with cellulosic materials as filler.

However, at least 14% of m-dinitrobenzene is required to produce the completely thermosetting resins of this invention. 17.6% has been established by experiment as generally a preferred proportion for the previously described advantages. Twenty percent has frequently been used to obtain rapid cure, and proportions up to 25% to obtain very low solubility in the final thermoset resin. Even so much as 33% has been used in some instances, although a proportion of m-dinitrobenzene equal to 25% of the pitch or higher may be wasteful or objectionable. Thus, the proportions of m-dinitrobenzene from 7.5 to 25% of the pitch have given useful products, although 14 to 20% has been the preferred range.

The proper amount of oxidizing agent, even though it must be established empirically, depends on properly balancing the reducing capacity of the pitch and the oxidizing capacity of the oxidizing agent, even though these capacities cannot be expressed precisely in terms of oxidation-reduction equivalents. This is shown in the results of an experiment wherein completely thermoset resins were prepared from a coal tar pitch using two different oxidizing compounds, the oxidizing capacities of which resulted from the presence of the same oxidizing function, namely, the nitro group. The amount of each oxidizing agent was chosen to provide the same amount of oxidizing capacity in accordance with the hypothesis that, given the same oxidizing group reacting with the same reducing agent, the pitch, the course of the oxidation-reduction reaction should be the same, and a similar degree of polymerization should be effected by reaction of a like weight of nitro group regardless of the compound in which it occurred. After calculating the amounts of the two, about 20% excess of m-dinitrobenzene over the equivalent amount of picric acid was used to allow for the greater volatility of the m-dinitrobenzene and for the probable effect of that part of the oxidant molecule retained in the resin. Such retention, amounting to about 10% of the product weight as shown in the results of the experiment reasonably should be greater for the trifunctional picric acid than for the difunctional m-dinitrobenzene, and should affect the solubility of the product to some extent. The close correspondence of polymerization level of the two products of the experiment, as shown by solubility in benzene, demonstrates that the extent of polymerization is primarily a result of the amount of oxidizing capacity used up in the polymerization reaction.

The results of the experiment are as follows:

| | m-Dinitro-benzene | Picric acid |
|---|---|---|
| Amount used per 100 grams of pitch: | | |
| Grams | 25.0 | 17.8 |
| Moles | 0.15 | 0.078 |
| Grams of nitro group | 13.7 | 10.8 |
| Gram molecular weights of nitro group | 0.30 | 0.24 |
| Conditions of Heating: | | |
| Time (hours) | 168 | 72 |
| Temperature (° C.) | 205 | 225 |
| Solubility of resin produced in benzene (percent) | 10.0 | 9.5 |
| Yield of resin (percent of pitch) | 108.5 | 110.5 |

The following considerations further strengthen the hypothesis that oxidation is the prime function of the reagents which were found useful for converting pitches to the thermoset resins described in the application Serial No. 564,110 and the thermosetting resins of this invention. If the polymerization actually is promoted or effected by oxidation, then the effect of equivalent amounts (with respect to oxidizing capacity) of two difunctional oxidizing agents should correspond even more closely than in the case of a di- and a tri-functional reagent as used in the above described experiment. Equations 1 and 2 below are believed to represent plausible reactions for two difunctional reagents which have been found useful for the practice of this invention:

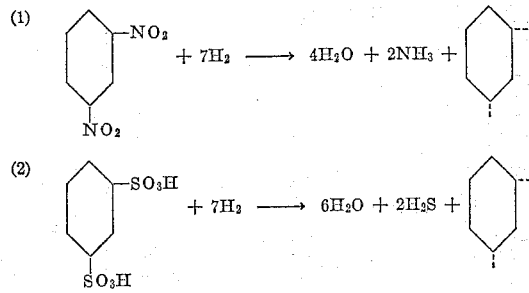

These equations represent that one mole of m-dinitrobenzene or one mole of benzene disulfonic acid removes seven moles of hydrogen from the pitch. This hydrogen is eliminated as water, ammonia or hydrogen sulfide, while the carbon ring of either reagent, after removal of oxidizing functional groups is designated as the free radical E which may be capable of combining in the polymer molecule. The gaseous end products, e.g. hydrogen sulfide and ammonia, are partially removed during the production of the partially cured resinous materials of this invention and the precure of the molding compositions containing such resinous materials. The remainder of such gaseous end products are released in the final cure in accordance with the processes described in the copending application Serial No. 564,110.

Assuming those equations correctly represent the reaction of the two oxidizing agents (and that similar equations could be written for other oxidizing agents), a gram equivalent weight of oxidizing agent for purposes of forming the novel resins of this invention can be defined as the number of grams of reagent required to oxidize one gram molecular weight of hydrogen. Thus, one gram molecular weight of m-dinitrobenzene or of benzene disulfonic acid reacts with seven gram molecular weights of hydrogen and an equivalent weight of dinitrobenzene would be 24 grams, of benzene disulfonic acid 34 grams. The reaction of an equivalent amount of each of the two oxidizing agents with a like amount of pitch should yield resinous products of approximately the same degree of polymerization. The correctness of this conclusion was proven by the preparations of Example 2 wherein m-dinitrobenzene and benzene disulfonic acid were reacted in the proportion of approximately 0.4 gram equivalent weight of oxidizing agent per 100 g. of pitch.

EXAMPLE 2

To 18 g. of the pitch used in Example 1, 2.00 g. of m-dinitrobenzene were added. To a duplicate sample of pitch 2.84 g. of benzene disulfonic acid were added, and two preparations were heated for 24 hours at 225° C. Similar pairs of reactions were carried out with 48, 72, and 96 hours of heating, respectively. The solubility of each resin preparation was determined as a measure of the degree of polymerization.

| Resins prepared from 18 g. pitch and 2.00 g. m-dinitrobenzene | | Resins prepared from 18 g. pitch and 2.84 g. benzene disulfonic acid | |
|---|---|---|---|
| Time of heating at 225° C. (hours) | Solubility in benzene (percent) | Time of heating at 225° C. (hours) | Solubility in benzene (percent) |
| 24 | 35.0 | 24 | 33.5 |
| 48 | 35.0 | 48 | 35.5 |
| 72 | 34.0 | 72 | 34.0 |
| 96 | 33.5 | 96 | 33.5 |

The close correspondence of solubilities shows that approximately the same degree of polymerization was effected by 2.84 g. of benzene disulfonic acid as by 2.00 g. of m-dinitrobenzene under like conditions of reaction. Since these amounts were chosen on the basis of predicted oxidation reactions, the preparations of Example 2 confirm the hypothesis that the prime function of the reagents effective for the formation of the novel resins is facilitation of hydrogen removal by oxidation.

In Example 2 solubility is used as a criterion of degree of polymerization. Other criteria could be used. Thus, it is characteristic of all polymerization systems that, as degree of polymerization becomes progressively higher, not only does solubility decrease, but also volatility falls and fusion of the polymerized product becomes progressively more difficult, requiring progressively higher temperatures or, in some polymerization systems such as that by which the novel resins are formed, becoming impossible at any temperature.

EXAMPLE 3

Samples of resin were prepared as in Example 1, using the same pitch and the same method of heating. In this example, four parts of the "medium" pitch were used to one part of m-dinitrobenzene. The samples were heated at 185° C. for different time intervals as shown below, and the yield and solubility in benzene were determined for each product. Results compare as follows:

| Time of heating (hours) | Yield of resin (percent of pitch used) | Characteristics of product—Solubility in benzene (percent) |
|---|---|---|
| 12 | 119.1 | 51.0 |
| 24 | 117.4 | 46.0 |
| 72 | 115.4 | 38.0 |
| 120 | 112.5 | 30.0 |
| 168 | 112.8 | 26.0 |
| 240 | 113.6 | 24.5 |
| 336 | 113.2 | 12.5 |

The data of Example 3 show that solubility decreased with increasing time of heating.

Fusibility, or melting point, is not a property which can be measured like solubility. Even the pitches of commerce, before reaction in accordance with this invention to form polymerization products, do not have true melting points. Rather they soften and liquify over a range of temperature, and the so-called melting points of pitches are determined by empirical methods well known in the art. After a moderate degree of polymerization, even these empirical methods are inapplicable, although the ability to fuse may persist after a rather extensive polymerization. A test was therefore devised to detect the ability of the highly polymerized resins to fuse even though a melting point cannot be determined. This test consists of grinding a sample to a fine powder, e.g., to pass a 65 mesh screen. When the fine powder is rapidly heated to 950° C., it will fuse into a continuous mass or at least adhere together before conversion to carbon if it is capable of fusion.

This test applied to the resin preparations of Example 3 showed the first four to be fusible; i.e., fusibility disappeared after about 120 hours of heating. The last three showed no signs of fusibility. Thus, in the practice of this invention, the polymerization is characterized by decreased fusibility and solubility. However, fusibility and solubility are not precisely correlated since as polymerization increases, some solubility may still be measured even after all signs of fusibility have disappeared. These fusibility tests confirm that a benzene solubility of below about 25% indicates the thermoset stage of a resin.

In Examples 1, 2 and 3, the preparation of the resins has been illustrated by use of a single pitch. However, the preparation of the resins is not limited to the use of a single starting material, pitches of the class defined herein being generally useful as starting materials. Examples of the use of other pitches are shown in Example 4.

EXAMPLE 4

Intimate mixtures of m-dinitrobenzene with each of several pitches were heated, in substantially the same manner as in preceding examples, to effect polymerization. Identity of the pitches and the exact conditions of reaction are given in the following tabulation.

Thus far it has been disclosed that the practice of this invention requires, first, selection of a suitable hydrocarbonaceous pitch starting material; and, second, reaction therewith of any of a wide variety of oxidizing reagents. The degree of polymerization is dependent on the amount of reagent used, the reaction time and temperature. The effects of time, temperature, and amount of reagent, using one pitch and one reagent for the purpose will now be demonstrated more precisely.

To this end, the preparations of Example 5 have been arranged to show the effect of time at reaction temperature. In these preparations, a "medium" pitch melting at about 100° C. was used with the indicated amounts of reagent (m-dinitrobenzene), and the time at reaction temperature was varied. At each level of reagent the time was increased until no further polymerization, as measured by solubility, could be observed, or until reaction was proceeding only at a very slow rate.

EXAMPLE 5

*Resins prepared with "medium" pitch and m-dinitrobenzene as oxidizing reagent*

| Amount of reagent (percent of pitch) | Reaction temperature (° C.) | Reaction time (hours) | Resin Characteristics | |
|---|---|---|---|---|
| | | | Yield (percent of pitch) | Solubility in benzene (percent) |
| 5.3 | 185 | 24 | 102.9 | 53.0 |
| | | 48 | 102.5 | 49.2 |
| | | 72 | 102.6 | 49.5 |
| | | 96 | 102.4 | 48.0 |
| | | 120 | 102.4 | 47.4 |
| | | 168 | 102.0 | 48.7 |
| 11.1 | 165 | 24 | 107.3 | 57.0 |
| | | 48 | 105.6 | 51.3 |
| | | 72 | 105.2 | 48.0 |
| | | 96 | 104.9 | 48.3 |
| | | 120 | 105.5 | 48.0 |
| | | 168 | 104.6 | 45.0 |
| | | 336 | 102.4 | 37.0 |
| 11.1 | 185 | 12 | 107.7 | 49.0 |
| | | 24 | 107.6 | 46.5 |
| | | 72 | 106.1 | 40.5 |
| | | 120 | 105.1 | 32.5 |
| | | 168 | 104.1 | 31.0 |
| | | 240 | 104.5 | 30.5 |
| | | 336 | 104.5 | 29.4 |
| 11.1 | 205 | 12 | 104.0 | 41.0 |
| | | 24 | 103.1 | 39.5 |
| | | 48 | 105.2 | 36.5 |
| | | 72 | 103.1 | 35.0 |
| | | 96 | 102.4 | 35.5 |
| | | 120 | 102.3 | 36.5 |
| | | 168 | 103.1 | 33.5 |
| 11.1 | 225 | 8 | 103.3 | 40.0 |
| | | 16 | 102.3 | 36.0 |
| | | 24 | 102.1 | 35.0 |
| | | 32 | 102.2 | 35.0 |
| | | 48 | 101.1 | 34.0 |
| | | 72 | 102.0 | 33.5 |
| | | 96 | 102.2 | 35.5 |
| | | 120 | 101.2 | 30.0 |
| 11.1 | 250 | 4 | 95.4 | 35.0 |
| | | 8 | 99.7 | 34.7 |
| | | 12 | ------ | 31.0 |
| | | 16 | 98.3 | 27.0 |
| | | 24 | 97.3 | 26.5 |
| | | 48 | 92.7 | 19.5 |
| | | 72 | 96.0 | 16.0 |
| | | 96 | 92.5 | 21.0 |
| 25.0 | 185 | 12 | 118.7 | 51.0 |
| | | 24 | 117.4 | 46.0 |
| | | 72 | 115.5 | 38.0 |
| | | 120 | 112.6 | 30.0 |
| | | 168 | 112.9 | 26.0 |
| | | 240 | 113.7 | 24.5 |
| | | 336 | 112.9 | 22.5 |
| 25.0 | 225 | 16 | 114.2 | 25.0 |
| | | 24 | 116.3 | 28.5 |
| | | 32 | 115.6 | 11.5 |
| | | 48 | 115.3 | 11.4 |
| | | 120 | 113.3 | 4.5 |

| Resin sample | Starting material | Amount of m-dinitrobenzene (Percent of pitch) | Conditions of preparation | | Yield (Percent of pitch) | Solubility in benzene (Percent) |
|---|---|---|---|---|---|---|
| | | | Reaction time (hours) | Reaction temperature (° C.) | | |
| A | A soft coal tar pitch | 11.1 | 72 | 205 | 101.0 | 44.5 |
| B | A medium pitch (different material from that used in other examples). | 11.1 | 72 | 225 | 103.0 | 35.0 |
| C | A hard coal tar pitch | 11.1 | 72 | 205 | 104.0 | 35.4 |
| D | ------do------ | 11.1 | 72 | 225 | 105.5 | 29.5 |

Taking solubility as the measure of completeness of the polymerization reaction (i.e. when the solubility in benzene becomes substantially constant with further heating), the tabulation of Example 5 shows:

(a) With any given amount of reagent and reaction temperature, a certain time interval is required before the reaction is complete.

(b) At a given reaction temperature, the time required becomes greater as the amount of reagent is increased. Thus at 185° C., about 72 hours are required with 5.3% of reagent, 168 hours with 11.1%, and 336 hours with 25%. At 225° C., 48 hours are required with 11.1% of reagent, 72 hours or more with 25%.

(c) With a given amount of reagent the time required becomes less as the reaction temperature is raised. Thus with 11.1% of reagent, 504 hours or more are required at 165° C., 168 hours at 185° C., 72 hours at 205° C., 48 hours at 225° C. At 250° C., also, it appears that 48 hours are required. However, it is to be noted, first, that the final solubility is of a lower order than for resins made at lower temperatures and, second, that the yields are consistently below 100% of the starting material. It is believed that the incidence of some additional reaction, beyond that occurring at lower temperatures between pitch and reagent, thus is indicated.

To demonstrate the effect of temperature in carrying out the invention, this condition has been made the variable in the preparations tabulated as Example 6. Herein the reaction times vary, but always are sufficiently long so that further polymerization at the indicated temperature proceeds only at a very slow rate.

EXAMPLE 6

*Resins prepared with "medium" pitch and m-dinitrobenzene as oxidizing reagent*

| Amount of reagent (percent of pitch) | Reaction time (hours) | Reaction temperature (° C.) | Yield (percent of pitch) | Solubility in benzene (percent) |
|---|---|---|---|---|
| 5.3 | 504 | 165 | 101.6 | 56.5 |
|  | 168 | 205 | 99.3 | 42.0 |
|  | 120 | 225 | 96.3 | 36.5 |
|  | 96 | 250 | 90.9 | 38.5 |
|  | 18 | 275 | 87.6 | 35.5 |
|  | 18 | 300 | ------ | 37.8 |
|  | 18 | 325 | 72.0 | 29 |
| 8.1 | 504 | 165 | 103.9 | 37.3 |
|  | 168 | 205 | 101.8 | 37.5 |
|  | 120 | 225 | 99.6 | 35.0 |
|  | 96 | 250 | 92.9 | 32.0 |
| 11.1 | 504 | 165 | 103.1 | 34.5 |
|  | 336 | 185 | 104.6 | 29.4 |
|  | 168 | 205 | 102.9 | 33.5 |
|  | 120 | 225 | 101.2 | 30.2 |
|  | 96 | 250 | 92.4 | 21.0 |
|  | 42 | 275 | 89.1 | 15.5 |
|  | 36 | 300 | 86.7 | 13.0 |
|  | 30 | 325 | 85.1 | 16.0 |
|  | 24 | 350 | 80.8 | 10.5 |
|  | 18 | 375 | ------ | 4.7 |
|  | 12 | 400 | 68.7 | 3.5 |
| 14.3 | 504 | 165 | 104.5 | 32.0 |
|  | 168 | 205 | 104.2 | 28.0 |
|  | 120 | 225 | 102.9 | 17.5 |
|  | 96 | 250 | 93.8 | 7.0 |
| 17.7 | 504 | 165 | 106.4 | 33.5 |
|  | 168 | 205 | 105.2 | 15.5 |
|  | 120 | 225 | 103.2 | 12.0 |
|  | 96 | 250 | 95.7 | 4.0 |

Again, as in previous discussion of Example 5, taking solubility as the measure of degree of polymerization, the tabulation of Example 6 shows:

(a) With any given proportion of reactant the tendency with increasing reaction temperature is toward a greater degree of polymerization.

(b) However, at reaction temperatures of 225° C. or lower the degree of polymerization obtained when the reaction is completed is approximately the same, regardless of temperature, if the proportion of reagent is not greater than 11.1%, as indicated by essentially constant solubility. It is to be understood, of course, that in interpreting the solubilities of the large number of preparations in Example 6, some allowances must be made for errors, such as chance experimental error, accidental admission of air during reaction etc. Experience has shown that a variation of ±2 to 3% in solubility is to be expected.

(c) At reaction temperatures of 250° C. or higher definite and characteristic differences in the products are observed. Yield drops suddenly, and there is a marked decrease in solubility and volatility. It is believed that these sudden changes indicate the incidence of a further step occurring in the polymerization reaction by which the novel resins are formed at temperatures of 225° C. or lower. It is recognized that evaporation either of starting material or reagent could also explain the decrease in yield. Probably both causes are effective, and the invention is not limited by this interpretation.

(d) Yields are markedly greater at temperatures below 250° C. than at this temperature or above. This drop in yield is observed regardless of the amount of reagent used, although it is less with higher proportions of reagent. By contrast, the degree of polymerization increases markedly, even at temperatures below 250° C. if sufficient reagent is used.

The observed effects of increasing temperature in the practice of this invention and the invention disclosed and claimed in the application Serial No. 623,549, filed November 21, 1956, now abandoned, may be explained as follows: Regardless of the reaction mechanism, the reaction by which the novel resins are formed from pitch and suitable reagents proceeds at an appreciable rate at 165° C., and at an increasing rate as the temperature is raised. In addition to the effect of temperature on rate of reaction, higher temperatures cause a greater extent of reaction; i.e. greater effectiveness of the reagents. This second effect of temperature is very noticeable at 250° C. or higher, but may be appreciable at lower temperatures if sufficient reagent is present.

Resins of this invention and of the invention of the application Serial No. 623,549 may thus be formed from the defined pitches and reagents in the range of between 165° and 400° C. The higher yields are obtained at temperatures below 250° C., although both yield and degree of polymerization depend on the amount of reagent used. In forming the novel resins the amount of reagent should be chosen on the basis of what is required with respect to yield and degree of polymerization.

To demonstrate further the effect of the amount of reagent used, there is arranged the tabulation of Example 7. Herein, as in Examples 5 and 6, the time of reaction always is sufficient to effect essentially complete reaction. The preparations are arranged to illustrate the effect, at several temperatures, from 165° to 400° C., of increasing the proportion of reagent up to 25% of the weight of the pitch used. Examples 5, 6 and 7 include thermosetting resins of this invention and thermoset resins of application Serial No. 623,549.

EXAMPLE 7

*Resins prepared with "medium" pitch and m-dinitrobenzene as oxidizing reagent*

| Reaction temperature (° C.) | Reaction time (hours) | Amount of reagent (percent of pitch) | Resin characteristics ||
|---|---|---|---|---|
|  |  |  | Yield (percent of pitch) | Solubility in benzene (percent) |
| 165 | 50 | 5.3 | 101.3 | 56.5 |
|  |  | 8.1 | 102.1 | 37.3 |
|  |  | 11.1 | 102.7 | 34.5 |
|  |  | 14.3 | 104.3 | 32.0 |
|  |  | 17.7 | 106.4 | 33.5 |
|  |  | 25.0 | 117.3 | 31.0 |

EXAMPLE 7—Continued

| Reaction temperature (°C.) | Reaction time (hours) | Amount of reagent (percent of pitch) | Resin characteristics | |
|---|---|---|---|---|
| | | | Yield (percent of pitch) | Solubility in benzene (percent) |
| 185 | 336 | 11.1 | 104.6 | 29.4 |
| | | 25.0 | 120.5 | 12.5 |
| 205 | 168 | 5.3 | 99.7 | 42.0 |
| | | 8.1 | 101.9 | 37.5 |
| | | 11.1 | 103.0 | 33.5 |
| | | 14.3 | 104.8 | 28.0 |
| | | 17.7 | 105.2 | 15.5 |
| | | 25.0 | 115.3 | 10.0 |
| 225 | 120 | 5.3 | 96.1 | 36.5 |
| | | 8.1 | 97.0 | 35.0 |
| | | 11.1 | 101.1 | 30.2 |
| | | 14.3 | 102.9 | 17.5 |
| | | 17.7 | 100.1 | 12.0 |
| | | 25.0 | 114.5 | 4.5 |
| 250 | 96 | 5.3 | 89.7 | 38.5 |
| | | 8.1 | 92.9 | 32.0 |
| | | 11.1 | 92.4 | 11.0 |
| | | 14.3 | 93.6 | 7.0 |
| | | 17.7 | 95.8 | 4.0 |
| | | 25.0 | ------ | 2.0 |
| 275 | 18 | 5.3 | 87.6 | 35.5 |
| | 42 | 11.1 | 89.1 | 15.5 |
| | 42 | 25.0 | ------ | 3.0 |
| 300 | 18 | 5.3 | ------ | 37.8 |
| | 36 | 11.1 | 86.7 | 13.0 |
| | 36 | 25.0 | 105.4 | 3.0 |
| 325 | 18 | 5.3 | 72.0 | 29.5 |
| | 30 | 11.1 | 85.1 | 16.0 |
| | 30 | 25.0 | 104.5 | 2.5 |
| 350 | 24 | 11.1 | 80.8 | 10.5 |
| | | 25.0 | 101.1 | 1.5 |
| 375 | 18 | 11.1 | ------ | 4.7 |
| | | 25.0 | 105.3 | 1.0 |
| 400 | 12 | 11.1 | 68.7 | 3.5 |
| | | 25.0 | 102.2 | 1.0 |

The tabulation of Example 7 demonstrates again the various effects of time and temperature which have been shown by Examples 5 and 6, and more specifically illustrates the effect of proportion of reagent under any given conditions of reaction time and temperature. Thus:

(a) Increasing the amount of reagent always results in increased yield and higher degree of polymerization as measured by solubility.

(b) The effectiveness of any given amount of reagent appears to increase as the temperature is raised. For example, at 165° C., use of the smallest proportion indicated, 5.3% of the pitch, resulted in only limited polymerization. At higher temperatures the effect of this small amount of reagent is greater. Similarly, use of a relatively large amount of reagent, e.g., 25%, had only a moderate advantage over 17.7% at 165° C., but at higher temperatures, even only 185° C., its effect becomes increasingly pronounced. Intermediate proportions of reagent, such as 14.3 or 17.7%, were of little advantage over 8.1 or 11.1%, at lowest temperatures, but at higher temperatures of 205° C. and 225° C., the advantage of increased amount of reagent becomes more pronounced.

(c) There appears to be some proportion of reagent between 17.7 and 25.0% of the pitch at which the effect on yield of product becomes exaggerated. Thus, in the tabulation of Example 7, the yields obtained with 8.1, 17.7 and 25.0% can be compared. The difference in yield may be as little as 3% between the first two levels of reagent. In contrast, the difference in yield with 25% as compared with 17.7% is 10 to 15% of the pitch weight. Evidently, as the concentration of the reagent is increased, the tendency on the part of the reagent molecules to be combined in the polymer molecule becomes suddenly more pronounced above a certain level of reagent.

The resinous products of this invention are prepared by reacting pitch with oxidizing reagents at elevated temperatures for a time sufficient to effect reaction. The pitch may be any of those falling within the class defined herein, but because of commercial availability it is preferably a coal tar pitch. Although any oxidizing agent may be used which can be mixed with the pitch there are, as has been heretofore explained, certain practical limitations which enter into the choice of an oxidizing agent. Preferably, the oxidizing agent should be one which may be intimately mixed with the pitch. In general, organic oxidizing agents and particularly those containing nitro groups, such as aromatic polynitro compounds, are found desirable. Polynitrobenzene and particularly m-dinitrobenzene are preferable because of practical as well as theoretical considerations.

The reaction or reactions by which the thermosetting resins are formed proceed at increasing rate as the temperature is increased up to about 350° to 400° C. At any selected temperature, the time required for reaction can be determined experimentally, and is dependent upon the amount of reagent used. Choice of the amount of reagent must be based on the properties required for the resinous product (yield, solubility, fusibility), as illustrated by Examples 5, 6 and 7.

Thermoset resins are produced from the thermosetting resins of this invention. For instance, with reference to Example 3, resins such as the first four which are soluble to the extent of 30 to 50%, and which are fusible in some degree, can be converted to the infusible and relatively insoluble condition by further heating, either at the same temperature as that at which the relatively soluble and fusible products were prepared, or at a higher temperature. Conveniently in practical applications of the practice of this invention, the cure will be completed by heating for periods of a few minutes to perhaps an hour at temperatures of 250° to 350° C., preferably 275° to 325° C., and most desirably at about 300° C.

EXAMPLE 8

A practical method of producing thermoset compositions from the thermosetting resins of this invention is to completely cure a partially cured resinous composition with or without other ingredients such as fillers. This complete curing is effected at temperatures between 250° and 350° C., preferably between 275° and 325° C., and most desirably at about 300° C. If the partially cured resinous composition is in the form of a molding compound, the application of super-atmospheric pressures of the order of 1000 to 4000 pounds per square inch is desirable.

The partially cured resinous material of this invention employed for this purpose is solid at 25° C., has a draw point of 175° to 275° C., preferably 200° to 260° C., and benzene-soluble components of 25 to 60%, preferably 35 to 45%.

The draw point of the partially cured resinous material is determined by heating a block of metal, fitted with a device for measuring its temperature sufficiently to allow the application of a thin layer or smear of the resin to be tested. The metal block is then allowed to cool while a sharp metal point is drawn across the surface of the smear. The minimum temperature at which a mark or draw line can be observed to be made by the metal point is the draw point of the resin. It has been found that the draw point is related to more conventional properties such as softening or melting point, flow rate, etc. Determination of draw point has the advantage as a criterion of degree of cure over other tests in that it can be carried out in a few minutes while a polymerization reaction is being carried out.

The partially cured thermosetting resins utilized in this example to produce thermoset resins are prepared by reacting a medium coal tar pitch which conformed to the requirements of the pitch heretofore defined and m-dinitrobenzene in the proportion by weight of 85 parts of pitch to 15 parts of the m-dinitrobenzene. The characteristics of the resins obtained when the reaction mixture is heated at 275° C. for varying periods of time is indicated in the following table:

PREPARATION OF RESINS AT 275° C.

| Preparation No. | Total time in oven (minutes) | Yield (percent of combined pitch and m-dinitrobenzene) | Draw point (° C.) | Solubility in benzene (percent) |
| --- | --- | --- | --- | --- |
| 1 | 10 | 94.0 | 180 | 47 |
| 2 | 15 | 94.0 | 267 | 35 |
| 3 | 20 | 91.5 | 265 | |
| 4 | 25 | 92.0 | | 33 |
| 5 | 30 | 90.0 | | 29 |
| 6 | 45 | 90.0 | | 31 |
| 7 | 60 | 90.0 | | 32 |

Preparations designated as 1, 2 and 3 conformed to the requirements of the partially cured thermosetting resins, and such partially cured thermosetting resins could be readily converted to the thermoset compositions by heating within the range of 250° to 350° C. For example, as shown in the above table, the heating of such resins at 275° C. for a sufficient period of time would produce infusible thermoset resins, as for example, those designated as preparations No. 4, 5, 6, and 7 in the above table.

The fully cured or thermoset state is indicated by the lack of manifestation of fluidity of the resin at 375° C.

A convenient test to determine whether a resin manifests fluidity is to place a few particles or granules of crushed resin in a metal block pre-heated to 375° C. If in the course of a few seconds the irregular particles coalesce or contract in the manner of a liquid into minimum volume and approach spherical shape, the resin has not been thermoset. If, on the other hand, the irregular shape of the particles is retained, the material is thermoset, fully cured, and infusible even though further hardening may occur.

In many, but not all, cases the thermoset state can also be ascertained by the benzene-soluble components of the resin. If the benzene-soluble components are less than 20%, the thermoset state has been reached. However, if the benzene-soluble components exceed 20%, the resin might still be thermoset. This is illustrated by the thermoset compositions designated as preparations 4, 5, 6, and 7 in the above table in which the benzene-soluble component is significantly greater than 20%. It has been found that the benzene-soluble component falls to the 20% level when such thermoset resins are heated over longer periods of reaction time.

EXAMPLE 9

A resin was prepared by heating a mixture of 85 parts of coal tar pitch and 15 parts of m-dinitrobenzene at 195° C. to 210° C. until the draw point was 205° C. The product, a shiny brittle solid, was finely ground in a hammer mill. A mixture of 100 parts of the powdered resin and 100 parts of asbestos floats was prepared by tumbling the ingredients in a rolling jar for about 20 minutes. Forty grams of the asbestos-resin mixture, compressed at room temperature at 3000 p.s.i. to form a disc approximately the size and shape desired as a final product, was placed in an oven at 300° C. for 30 minutes. At the beginning of this treatment, as the temperature of the disc (preform) approaches 300° C., its color changed rapidly from gray to black as the flow of the resin covered the asbestos surface, and it became very soft and compressible. At the end of the oven treatment, it had reached the state which is desirable for final molding, i.e., the asbestos surface covered with a film of resin as shown by the black color, but the texture of the preform such that, at oven temperature, it was no longer very soft but barely compressible under pressure due to the advancement of the cure of the resin. This precured thermosetting composition at 300° C. would manifest plasticity when subjected to 500 pounds per square inch pressure and no significant plasticity when subjected to 5 pounds per square inch pressure. The precured preform then was placed in a cylindrical mold at 250° C., allowed to absorb heat for three minutes before the application of pressure, then subjected to 3000 p.s.i. for one hour while the temperature was maintained at 250° C. The mold was opened without cooling. The product, which was thermoset, was a shiny, hard disc, even at mold temperature, which conformed to the dimensions of the mold and did not materially change when cooled to room temperature or when heated to 300° C. It would manifest no significant plasticity at 300° C. when subjected to 500 pounds per square inch pressure.

EXAMPLE 10

From the same resin used in Example 9 a mixture with asbestos floats was prepared in the manner described except that 90 parts of resin was used with 100 parts of floats. A preform, made as described in Example 9, was placed in an oven at 300° C. for 25 minutes. The preform, placed in a mold at 300° C., first was allowed to heat for 12 minutes before the application of pressure, then was pressed at 3000 p.s.i. for 20 minutes. After cooling to approximately room temperature, the pressure was released, and the molded disc obtained was similar to that obtained in Example 9. It was hard, black and shiny, and permanently rigid even when heated to 300° C.

The thermosetting resins of this invention can be applied to many of the uses of conventional thermosetting and thermoset resins. Thus, when the polymerization has been carried only to a relatively low degree of completion, the resins can be used as an impregnant to fill the voids of porous media in order to reduce permeability or increase strength; the polymerization is then carried out or completed in the pores, leaving them filled with the thermoset resin of the application Serial No. 623,549. Or, as described in Examples 9 and 10, the resins can be mixed with fibrous or granular fillers such as asbestos, slatedust, etc., and the "molding powders" thus prepared can be formed into useful shapes by molding and extruding. The resin in the formed shape then can be converted to the substantially infusible and relatively insoluble state by further heating carried out either as a part of the forming operation or as a separate step following the forming operation. The resin, either as a molten fluid or as a varnish can be used as a laminating resin with, for example, asbestos or glass fiber felt. The resin can be fully cured to the substantially infusible and relatively insoluble form and used as a filler or as an abrasive or frictional agent.

EXAMPLE 11

50 parts of long-fiber, acid-washed asbestos were blended with 35 parts of powdered resin which had been prepared by reacting 85 parts of pitch and 15 parts of m-dinitrobenzene until the draw point reached 205° C. Preliminary blending was effected by tumbling the ingredients together in a jar mill for about 15 minutes. The clumps characteristic of the acid-washed asbestos were broken up by passing through a 12 mesh screen, and the composition was again tumbled for about 15 minutes. From the molding composition, preforms were prepared by pressing approximately 50 grams in a cylindrical mold at 3000 p.s.i. at room temperature. These preforms without preliminary curing were then fully compressed and cured under pressure by the following procedure:

A preform was placed in a mold, very slightly larger in diameter than the mold used in preforming, and held at 300° C. for 20 minutes. During this time no pressure was applied for the first 7 minutes, during which the preform came to mold temperature and most of the contained air and some of the polymerization gases could escape. Thereafter the pressure was raised during the next 3 minutes to 2000 p.s.i., the mold being vented by release of pressure every minute. Then for 7 minutes the pressure was held at 2000 p.s.i., except that venting was effected every 1 to 2 minutes by momentarily releasing the pressure. Finally, pressure was held at 2000 p.s.i. without venting for 3 minutes, temperature being held at 300° C., and thereafter until the mold had cooled to about 100° C. The molded disc was then ejected from the mold. To insure complete cure and to eliminate any small traces of unpolymerizable material, which would be disadvantageous in chemical applications, the disc was placed in an oven and heated 12 hours at 280° C., then 2 hours at 300° C., and finally for one hour at 325° C. During this oven post-cure the disc did not soften or change shape. It lost only 0.4% of its weight, and the thickness increased by less than 0.3%. The finished disc was smooth and shiny, with an apparent density of 1.94 g./cc. It was resistant to water, caustic, acids and solvents as described in copending application (Adams and Lebach tests). Formed in suitable shapes, the material is useful for chemical vessels, plating tanks, reaction towers, etc.

EXAMPLE 12

(I) A mixture of 93 parts of pitch and 7 parts of m-dinitrobenzene was heated beginning at 175° C., and finally at 250° C., until the oxidizing agent had completely reacted. The product was a thermoplastic with a draw point of 240° C., the proportion of oxidizing agent used being insufficient to form a thermoset resin. The resin was ground in a hammer mill. A molding composition was prepared by blending 30 parts of the powdered resin and 70 parts of asbestos floats, the ingredients being tumbled together in a jar mill for about 20 minutes. The molding composition was formed into discs by compressing 50 g. samples at 6000 p.s.i. in a cylindrical mold 2¼" in diameter. The molded discs had sufficient strength for handling, but they were relatively weak, being easily broken or crumbled in the hand, and were gray in color because the resin had not flowed over the surface of the filler. When the discs were placed in an oven at 300° C. for 30 minutes, the thermoplastic resin melted and flowed over the filler surface. The discs darkened and softened as they reached oven temperature, but hardened as they again cooled and retained the dark color of the resin. At room temperature they were strong, rigid pieces.

(II) In 10 parts of coal tar pitch at 125° C. was dissolved 1 part of m-dinitrobenzene. Then 23 parts of asbestos fiber, preheated to 125° C., were stirred into the mixture of pitch and m-dinitrobenzene. While the temperature was kept at about 125° C., stirring was continued until the asbestos fibers were uniformly coated with the mixture of pitch and m-dinitrobenzene. Approximately 45 g. of the coated asbestos was placed in a compression mold, also at 125° C., and compressed to form a coherent block ½" x 3" x about 1". The block was placed in an oven at 250° C. and heated for 24 hours. As the temperature of the block first approached oven temperature, it softened, then progressively hardened as reaction between pitch and oxidizing agent took place. After 4 hours at 250° C., the block was strong and rigid, slight softness being perceptible only when it was pressed with a pointed instrument. After 24 hours, the block was found to have lost only 1.6% of its weight and to have increased in volume by only 0.8%. The apparent density of the block was 1.76 g./cc. as it came from the mold, and 1.72 g./cc. after being cured for 24 hours.

In bonding fillers with resins formed by the reaction of pitch and oxidizing agents, the resin may be prepared separate from the filler, as in part I, or the resin-forming ingredients may be mixed with the filler at temperatures where significant reaction does not occur, and the resin-forming reaction can be carried out on the surface of the filler before or after forming, as in part II. In either case, strong molded articles can be obtained with the thermoplastic resins which are obtained when the proportion of oxidizing agent used is insufficient to form a thermoset resin, as in Example 12, part I.

Thermoplastic resins of widely varying hardness are useful as bonding resins. Thus, as in Example 1, the resin may be so soft that, at temperatures of 300° C. or even lower, it will melt to a free flowing liquid that spreads over the filler surface by wetting action. Such resins in the free state, i.e., without filler, can be characterized by melting or softening points, including the draw point of this application. On the other hand, as in part II hereof, the thermoplastic bonding resin may be so hard that, in the filled state when fully compressed, softness is barely perceptible even at curing temperatures. In the free state, such hard resins may not freely or completely melt, though they do soften at elevated temperatures. To illustrate, resins have been prepared by using m-dinitrobenzene in proportion of 9% to 12% of the pitch weight. These may be so hard that, if particles are heated in the range of 300–400° C., they retain their shape even when carbonizing temperatures are reached. However, such particles do soften at these temperatures: If pressed, they will flatten, or they can be extruded, and if carbonized while in contact, they will stick together. To resins of this type in large masses softening or draw points are not applicable as a means of characterization. They must be characterized by penetration tests, flow under pressure, solubility, etc.

As examples of relatively hard thermoplastic, but not thermosetting resins, I cite the following:

EXAMPLE 13

A mixture of 45 parts of pitch and 5 parts of m-dinitrobenzene was heated at 185° C. for one week. During this time as the polymerization progressed, the mixture hardened until at the reaction temperature it was apparently a hard and brittle solid. Its solubility in benzene was 19.8%. If heated rapidly to about 330° C., particles could be pressed into a film, but would not flow of their own accord without some pressure.

EXAMPLE 14

A mixture of 44 parts of pitch and 6 parts of m-dinitrobenzene was heated at 185° to 225° C. for 48 hours, then finally at 230° C. for 12 hours. The product was apparently hard at 230° C. Particles of the resin heated rapidly to about 375° C. could be flattened to a film by pressing, and a sample of the ground resin heated to carbonizing temperature formed a coherent, porous body, in which the particles had not completely flowed together during carbonization.

EXAMPLE 15

A thermosetting resin, prepared by reacting 85 parts of pitch and 15 parts of m-dinitrobenzene, was ground to a fine powder in a hammer mill. 60 parts of the powdered resin and 100 parts of commercial silica flour, ground to a fineness allowing 95% to pass a 200 mesh screen, were blended by tumbling in a jar mill for about 20 minutes. Then, while the blended powders were stirred, 20 parts of anthracene oil were added dropwise. The material was allowed to stand for 12 hours while the anthracene oil plasticizer softened the resin particles. The gummy composition thus obtained can be spread in a layer with a trowel, and moderate pressure will cause it to adhere to foreign surfaces such as ceramics, clay products, cement, carbon, and the like. One side of a ceramic brick was coated with the composition described to a thickness of about 1/16". A second brick was placed on top of the layer of cement, the two were firmly pressed together, and placed in an oven. The bricks were heated at 150° to 190° C. for 6 hours, then at 190° to 225° C. for 4 hours, and finally at 225° C. for 12 hours. The heating evaporated much of the plasticizer, and cured the cement to a thermoset state. The bricks were firmly bonded together.

EXAMPLE 16

Pitch and m-dinitrobenzene were blended by melting together at 125° C. in proportion of 15 parts of m-dinitrobenzene and 85 parts of pitch. 2 lbs. of the blend were placed in a steam-jacketed mechanical mixer held at 150° C. While the mixer was in operation, 8 lbs. of foundry sand, preheated to about 160° C., were added, and operation of the mixer was continued until the sand was uniformly coated with pitch-m-dinitrobenzene blend. The composition was then removed from the mixer and ground to pass an 8 mesh screen. 5 lbs. of the ground material were placed in a jar of a jar mill and, while the jar was rolled to tumble the material, kerosene was sprayed through an opening in the lid of the jar until ¼ lb. had been added to the material. The resulting composition, consisting of sand, pitch, m-dinitrobenzene, and kerosene, was granular and moderately sticky. Although not suitable for use as a mortar as in Example 15, it could be hand-tamped, if used soon after preparation, to form closures of deep recesses, tubes, and the like. The composition described was packed by hand, within one hour of its preparation, into a 1″ pipe to a depth of 2″. After the pipe and packing had been heated at 150°–175° C., for 2 hours, then at 175°–225° C. for 6 hours, the packing had cured to a firm plug, rigid at the temperature of curing, and tightly adherent to the walls of the pipe.

EXAMPLE 17

In a steam-jacketed mechanical mixer, as described in Example 16, the following composition was prepared: First, 8.5 lbs. of pitch and 1.5 lbs. of m-dinitrobenzene were allowed to melt together at 150° C. Then, with the mixer in operation, 10 lbs. of asbestos floats, preheated in an oven at 160° C., were added and the mixing continued until the asbestos was uniformly distributed in the blend of pitch and m-dinitrobenzene. Then the composition was plasticized by addition of 2 lbs. of dibutyl phthalate, mixing being continued for about one-half hour until the composition was uniform. The final product, a composition of pitch, asbestos, dibutyl phthalate and m-dinitrobenzene, was very soft at 150° C., and sufficiently soft at room temperature to be trowelled. It was useful as thermosetting cement, being very easily trowelled if used at temperatures between room temperature and 150° C., or if the material to which it was applied was warmed to such temperatures. In one case, the cement composition was packed with a spatula into the break in a damaged ceramic vessel, the vessel being preheated before application to approximately 100° C. After application of the cement, the repaired vessel was heated for 2 hours at from 190 to 250° C., and finally held at 250° C. for 12 hours. The heating cured the cement to the thermoset state. It was adherent to the ceramic, and closed the break liquid-tight.

EXAMPLE 18

I have found that the rate of cure of my thermosetting compositions can be increased by the addition thereto of organic esters of polybasic inorganic acids. If, as described hereinbefore, a partially cured, thermosetting resin is prepared from 85 parts of pitch and 15 parts of m-dinitrobenzene by heating the mixture at about 185° C. until the draw point is about 200° C., the rate of cure when the resin is heated further can be measured by determining the draw point. When the resin is further heated at 210° C. for 3 hours, the draw point increases 10° C. per hour. On the other hand, a resin of 200° C. draw point prepared at 185° C. from a mixture of 85 parts of pitch, 15 parts of m-dinitrobenzene, and 10 parts of tricresyl phosphate, when similarly heated further at 210° C., hardens at a much faster rate as shown by an increase in draw point of 25° C. per hour. Ester reagents can be added, with similar effect on curing rate, to the partially cured thermosetting resins prepared from pitch and oxidizing agent.

EXAMPLE 19

When 10% of triphenyl phosphite is blended with a powdered resin of about 200° C. draw point, and the blend then heated at selected temperature, the cure time, as determined by consistency, is reduced by about half, for example, from about 10 minutes to 5 minutes at 200° C. The esters, besides speeding cure, have the added advantage that they act as plasticizers before reaction. Thus, the addition of a few percent of ester will first reduce the softening point of the resin, permitting it to be more readily impregnated into a laminating material or more easily spread over a filler surface. Subsequently, on further heating, the plasticizer is combined in the curing reaction, and the fully cured resin is non-volatile and highly resistant to chemicals and solvents.

While a resin having a higher draw point, say, above 175° C., is desirable where the resin is being combined with a heat-resistant material, such as molding sand, etc., it is important that where the combination is with cellulose, which cannot resist elevated temperatures, the resin should have a relatively low draw point, as, for example, in the neighborhood of 150° C. or above. In such an operation, the resin is preferably a thermoplastic and non-thermosetting resin made with a small amount of oxidizing agent. This material, upon heating to a low temperature, becomes fluid and will enter the pores of the cellulose to fill them, and then the mixture can be formed under pressures and finally heated to temperatures of about 300° F. to form a strong, dense, molded article. I prefer to employ a temperature of around 300° F. and a pressure not greater than 2,000 lbs. It will be noted here that the low temperature is one required for cellulose and similar material which has low heat resistance, and I employ a resin which is not thermosetting but which is thermoplastic. In the forming of a thermosetting resin, I prefer a resin having a draw point of at least 165° C., often 200° C., but in the case of a thermoplastic resin (which is not thermosetting) for use with cellulosic fillers, I prefer the low draw point of 150° C. so that the cellulose or other low heat-resistant material may be effectively molded by the use of this resin.

In the cold molding operation which has been described, I prefer to employ a thermosetting resin rather than a thermoplastic resin. The thermosetting resin which is ground to form a granular material is mixed with the filler and the resulting composition shaped in a mold by pressure at room temperature or thereabove. The molded material is then put in an oven to effect cure.

In the shell molding operation, I prefer also to use the thermosetting resin of this invention which can be ground readily in a hammer mill without becoming sticky. The resin is mixed with molding sand or the molding composition and the shell formed and baked in an oven. The oven baking removes oils from the resin, and the residual resin is capable of forming a substantial amount of carbon when subsequently heated to carbonizing temperature. The nongraphitic form of carbon produced when such temperature is reached during the pouring of the metal keeps the sand from burning into the metal because the carbon will not be wet by the metal.

While, in the foregoing specification, I have referred to the use of various oxidizing agents in the forming of the resin from pitch, etc., I prefer not to use gas as an oxidizing agent. In the first place, one cannot dissolve, except at prohibitive pressure, enough gas to furnish sufficient oxidizing capacity to bring the resin to the thermoset stage. It is necessary to supply the oxygen continuously, but long before the resin reaches the thermoset stage the material becomes thick and gummy and one cannot bubble gas through the material.

Although the invention has been illustrated in connection with certain specific reactions, ingredients and pro-

I claim:

1. The process of producing a hydrocarbonaceous resin, which comprises mixing a hydrocarbonaceous pitch with an oxidizing agent selected from the group consisting of solid and liquid oxidizing agents and heating said mixture in the presence of a phenolic ester of a polybasic acid selected from the group consisting of tricresyl phosphate, triphenyl phosphite, and phenyl sulfate at a temperature within the range of 165–400° C. for a time sufficient to obtain a reaction product having a draw point within the range of 150–275° C. and containing 25–60% of benzene-soluble components, said hydrocarbonaceous pitch having a specific gravity of at least 1.02 at 25° C., yielding at least 60% of a solid material based upon the weight of said pitch upon heating said pitch for 72 hours at 450° C. in a closed vessel where distillation is not possible, and said resulting solid material, when heated to 950° C. at atmospheric pressure in the absence of oxygen, yielding a carbon residue amounting to at least 80% of said solid material.

2. The process of producing a hydrocarbonaceous resin, which comprises mixing a hydrocarbonaceous pitch with an oxidizing agent selected from the group consisting of solid and liquid oxidizing agents and heating said mixture in the presence of tricresyl phosphate at a temperature within the range of 165–400° C. for a time sufficient to obtain a reaction product having a draw point within the range of 150–275° C. and containing 25–60% of benzene-soluble components, said hydrocarbonaceous pitch having a specific gravity of at least 1.02 at 25° C., yielding at least 60% of a solid material based upon the weight of said pitch upon heating said pitch for 72 hours at 450° C. in a closed vessel where distillation is not possible, and said resulting solid material, when heated to 950° C. at atmospheric pressure in the absence of oxygen, yielding a carbon residue amounting to at least 80% of said solid material.

3. The process of producing a hydrocarbonaceous resin, which comprises mixing a hydrocarbonaceous pitch with an oxidizing agent selected from the group consisting of solid and liquid oxidizing agents and heating said mixture in the presence of triphenyl phosphite at a temperature within the range of 165–400° C. for a time sufficient to obtain a reaction product having a draw point within the range of 150–275° C. and containing 25–60% of benzene-soluble components, said hydrocarbonaceous pitch having a specific gravity of at least 1.02 at 25° C., yielding at least 60% of a solid material based upon the weight of said pitch upon heating said pitch for 72 hours at 450° C. in a closed vessel where distillation is not possible, and said resulting solid material, when heated to 950° C. at atmospheric pressure in the absence of oxygen, yielding a carbon residue amounting to at least 80% of said solid material.

4. The process of producing a hydrocarbonaceous resin, which comprises mixing a hydrocarbonaceous pitch with an oxidizing agent selected from the group consisting of solid and liquid oxidizing agents and heating said mixture in the presence of phenyl sulfate at a temperature within the range of 165–400° C. for a time sufficient to obtain a reaction product having a draw point within the range of 150–275° C. and containing 25–60% of benzene-soluble components, said hydrocarbonaceous pitch having a specific gravity of at least 1.02 at 25° C., yielding at least 60% of a solid material based upon the weight of said pitch upon heating said pitch for 72 hours at 450° C. in a closed vessel where distillation is not possible, and said resulting solid material, when heated to 950° C. at atmospheric pressure in the absence of oxygen, yielding a carbon residue amounting to at least 80% of said solid material.

References Cited by the Examiner
UNITED STATES PATENTS

| | | | |
|---|---|---|---|
| 2,992,935 | 7/61 | Winslow | 106—284 |
| 3,126,329 | 3/64 | Fort | 208—5 |

ALPHONSO D. SULLIVAN, *Primary Examiner.*

MARCUS LIEBMAN, *Examiner.*